United States Patent
Nock et al.

Patent Number: 5,910,114
Date of Patent: Jun. 8, 1999

[54] SYSTEM AND METHOD FOR CORRECTING THE GEOMETRY OF ULTRASONIC IMAGES ACQUIRED WITH A MOVING TRANSDUCER

[75] Inventors: Levin F. Nock, Bellevue; Barry Friemel; Patrick L. Sutcliffe, both of Redmond; Arun P. Tirumalai; Lee Weng, both of Issaquah, all of Wash.

[73] Assignee: Siemens Medical Systems, Inc., Iselin, N.J.

[21] Appl. No.: 09/164,211

[22] Filed: Sep. 30, 1998

[51] Int. Cl.$^6$ .................................................. A61B 8/00
[52] U.S. Cl. ............................................................ 600/437
[58] Field of Search ..................................... 600/443, 444, 600/447, 448, 449, 437

[56] References Cited

U.S. PATENT DOCUMENTS 5,568,811  10/1996  Olstad ...................................... 600/443

OTHER PUBLICATIONS

Bohs et al., "Experimental Velocity Profiles And Volumetric Flow Via Two–Dimensional Speckle Tracking," Ultrasound in Med. & Biol., vol. 21, No. 7, pp. 887–888, 1995.

*Primary Examiner*—Marvin M. Lateef
*Assistant Examiner*—Maulin Patel

[57] ABSTRACT

An ultrasonic imaging system and method is described in which the actual dimensions of images of tissue acquired with a moving transducer (22) are displayed. Since an image is distorted based upon the direction a transducer probe moves relative to the acoustic scanning direction of the transducer (22), the probe motion direction and the acoustic scanning direction are initially determined. If the probe is moving in the same direction as the scanning direction, the acoustic beam scanning speed of the moving probe relative to the tissue is determined by summing the acoustic beam scanning speed without probe motion with the probe speed. If the probe is moving in the opposite direction as the scanning direction, the acoustic beam scanning speed of the moving probe relative to the tissue is determined by taking the difference between the acoustic beam scanning speed without probe motion and the probe speed. The actual width of the image as represented in each pixel of a frame (32) acquired while the probe is moving is derived based upon a ratio of the acoustic beam scanning speed of the moving probe relative to the tissue to the acoustic beam scanning speed without probe motion. Finally, the actual dimensions of the image are displayed based upon the derived width of the image as represented in each pixel of the frame (32).

24 Claims, 6 Drawing Sheets

SYSTEM AND METHOD FOR CORRECTING THE GEOMETRY OF ULTRASONIC IMAGES ACQUIRED WITH A MOVING TRANSDUCER

FIELD OF THE INVENTION

This invention relates to ultrasonic diagnostic imaging and, more particularly, to an ultrasonic imaging system that produces images with signals received from a moving transducer.

BACKGROUND OF THE INVENTION

Ultrasound is an increasingly common tool for viewing the internal body matter, such as organs or tissue, of a patient in real time. In an ultrasonic imaging system, acoustic signals having frequencies in the range of $2 \geqq 20$ MHz are transmitted from a transducer into the patient. A portion of the acoustic signals are reflected by the body matter to create echoes that are received and interpreted to produce an image of the patient's body.

In practice, the transducer is in contact with the patient's body and moved around in order to locate a particular point of interest. Images are acquired both while the transducer is stationary and while the transducer is moving. When the transducer remains stationary while scanning, measurements made in accordance with the displayed image frames, for example the length of a segment, are substantially accurate. However, when a transducer moves while scanning, each image frame appears distorted. The image appears either slightly shrunk or stretched laterally, and thus, the measured length of a segment in such an image is either less than or greater than the actual length. As a result, a physician's ability to produce accurate diagnoses of the patient being scanned may be affected by either the inaccurate image display or the inaccurate measurements taken from the image.

Therefore, there is a need for an ultrasonic imaging system that produces images with signals received from a moving transducer that more accurately depict the patient's body.

SUMMARY OF THE INVENTION

This invention is a system and method for correcting the geometry of ultrasonic images acquired with a moving transducer. The system and method first determines the direction the transducer probe is moving in relation to the direction of the scan. If they are moving in the same direction, the acoustic scanning speed relative to the image acquired while the transducer is in motion is set equal to the sum of the acoustic scanning speed relative to the image while the transducer is stationary and the probe speed. If they are moving in opposite directions, the acoustic scanning speed relative to the image acquired while the transducer is in motion is set equal to the difference between the acoustic scanning speed relative to the image while the transducer is stationary and the probe speed. In general, the probe speed is estimated by dividing the length that a portion of an image translates horizontally from one frame to the next by the time between frames. This calculation gives an estimate in pixels per second. In order to estimate the probe speed relative to the image in millimeters per second, this value is multiplied by the width of tissue represented within each pixel while the probe is in motion. Then, the system derives the width of the tissue represented within each pixel while the probe is in motion based upon a ratio of the appropriate acoustic beam scanning speed relative to the image acquired while the transducer is in motion to the acoustic beam scanning speed relative to the image while the transducer is stationary. In turn, the derived width is used to correct the geometric accuracy of the image.

By calculating the width of tissue represented within each pixel while the probe is in motion, the distortion in the image can thereafter be corrected by using the derived data to visually correct the image on the display, to create a ruler to correctly measure the image displayed, or to output accurate measurements of segments selected by a user. With respect to correcting the image itself, the data can be used to correct either a standard B-mode frame, a single cine frame used to produce a SIESCAPE™ compound image, or a SIESCAPE™ compound image. Furthermore, the distortion can be corrected in images produced by transducers having various formats, including linear scan format and sector scan format.

DETAILED DESCRIPTION OF THE PREFERRED EMBODIMENT

This invention is an ultrasonic imaging system that more accurately depicts or assists in depicting the actual dimensions of an image acquired with a moving transducer.

Figure 1:
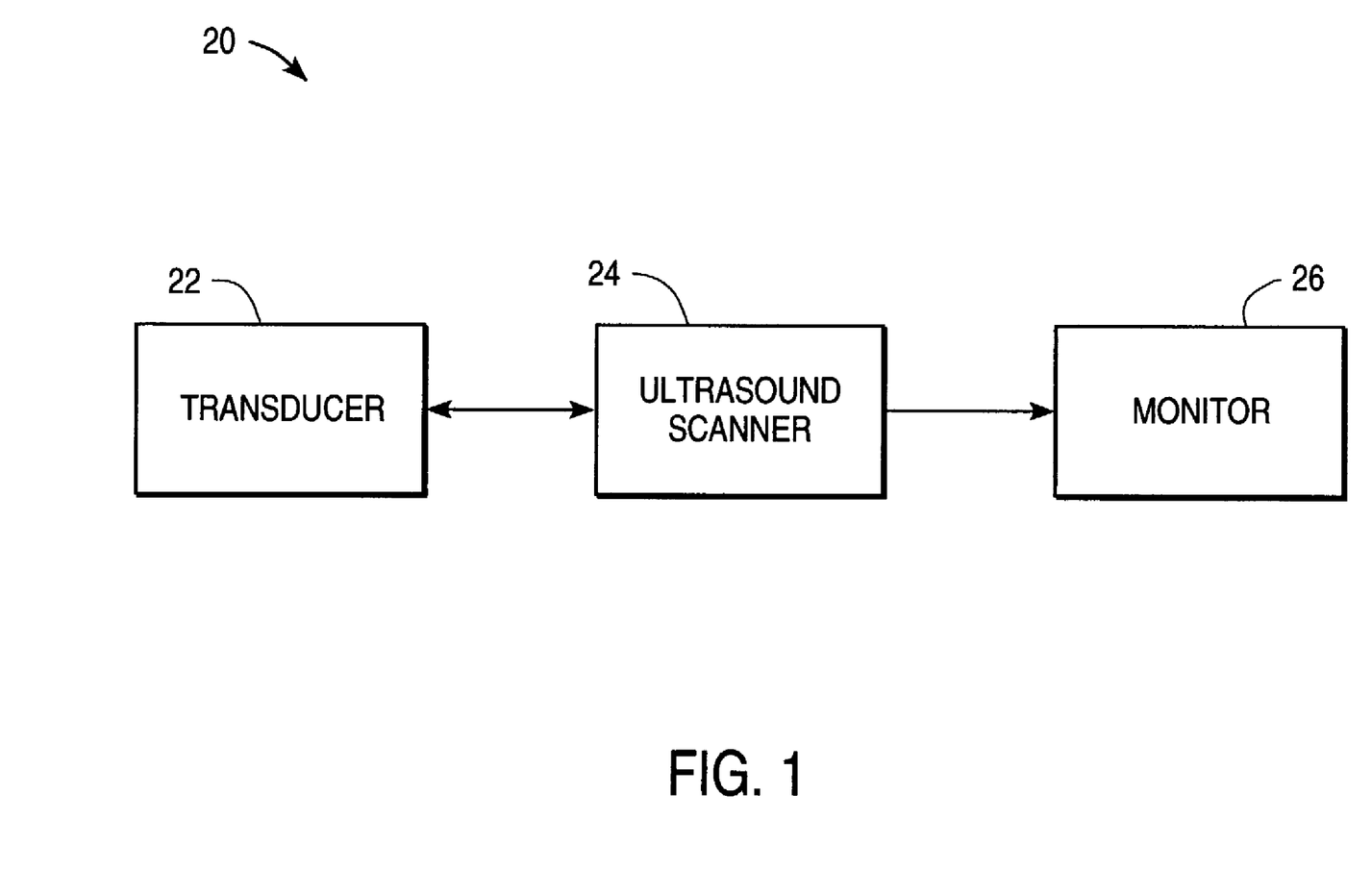
FIG. 1 is a simplified block diagram of an ultrasonic imaging system in which the present invention is implemented.

FIG. 1 is a simplified block diagram of an ultrasonic imaging system 20 in which this invention is implemented. The ultrasonic imaging system 20 includes a transducer 22, an ultrasound scanner 24, and a monitor 26. The ultrasound scanner 24 produces a series of electronic signals that are coupled to the ultrasound transducer 22. The ultrasound transducer 22 is essentially a probe for positioning on or moving along a patient's skin surface. The ultrasound transducer 22 comprises an array of transducer elements, each of which is preferably a piece of piezoelectric material that converts the electronic pulses produced by the ultrasound scanner 24 into an ultrasonic soundwave that is directed into the patient's body tissue. A portion of the ultrasonic soundwave is reflected by the internal body matter of the patient to create echoes that are received by the transducer 22. Upon receiving an ultrasonic echo, each transducer element generates an electronic signal that is representative of the echo. The electronic echo signals produced by the transducer elements in response to a received echo are coupled to the ultrasound scanner 24 where they are converted into an array of pixel intensities that are used to produce a digital ultrasound image that is displayed on the monitor 26.

As described above, the ultrasound transducer 22 has many piezoelectric elements. The elements are fired at slightly different times to direct a beam of ultrasound in a particular direction. In order to create an ultrasound image, the ultrasound is swept over a series of beam lines that fan out from the front face of the transducers. These beam lines begin at a first end of the probe and sweep to a second end of the probe, in order to image a section of the patient's body.

Figure 2A:
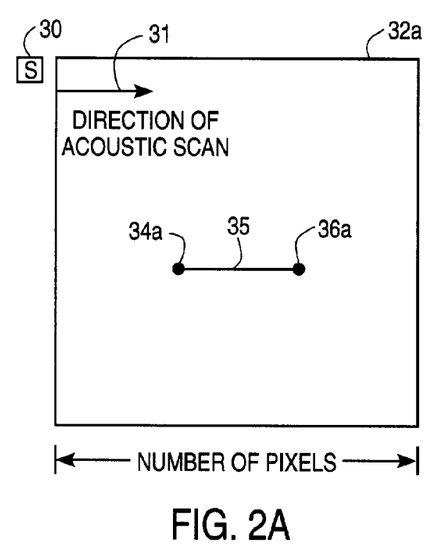
FIG. 2A illustrates an image depicting a pair of points as shown when the transducer probe is stationary.
Figure 2B:
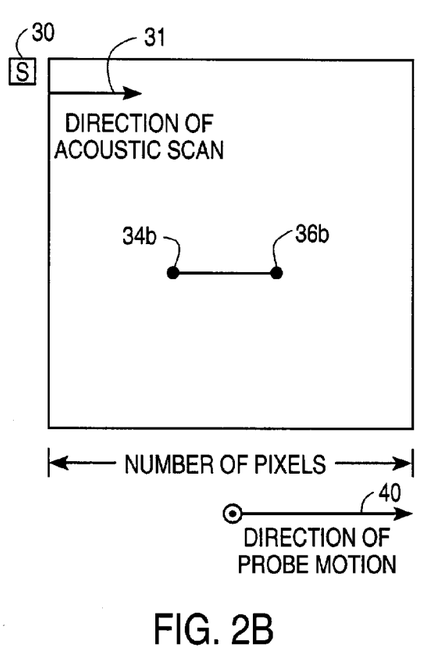
FIG. 2B illustrates an image of the pair of points of FIG. 2A as shown when the transducer probe moves in the same direction as the acoustic scan direction.
Figure 2C:
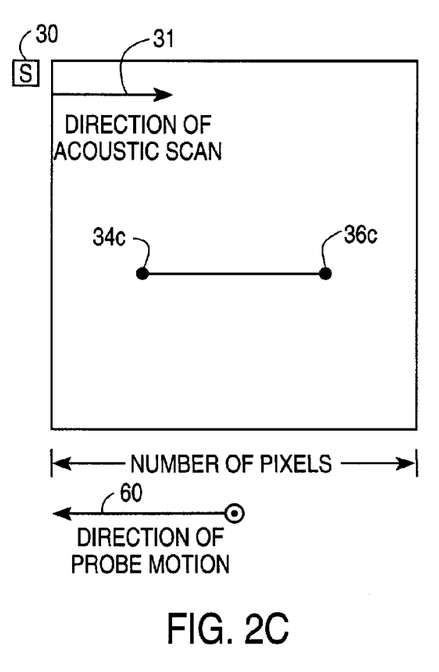
FIG. 2C illustrates an image of the pair of points of FIG. 2A as shown when the transducer probe moves in the opposite direction to the acoustic scan direction.

When the transducer probe moves laterally along the patient's skin surface while scanning, each image that is displayed in a frame on the monitor 26 is distorted. FIGS. 2A, 2B, and 2C together illustrate the distortion created in an image of a pair of points 34 and 36 while the transducer probe is in motion. FIG. 2A illustrates a frame 32a displaying an image produced when the transducer probe is stationary while scanning. An "s" sign 30 at the upper left corner of the frame 32a marks the beginning of the scan pattern. Thus, the beam lines scan across the frame 32 from the left to the right, as indicated by a ray 31. A point 34a and a point 36a make up the image displayed in frame 32a. The distance between points 34a and 36a is indicated by a line segment 35. The frame 32a as shown in FIG. 2A most accurately depicts the actual distance between the two points 34a and 36a.

Figure 3:
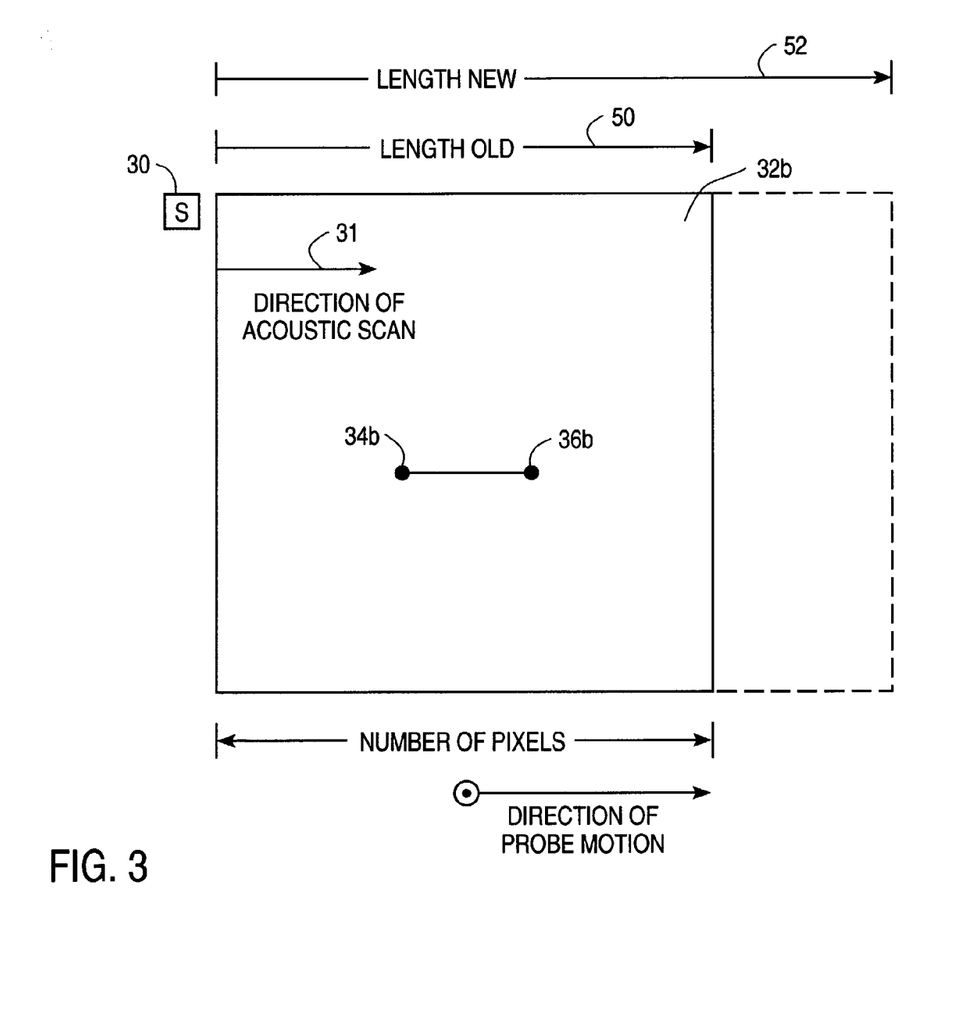
FIG. 3 illustrates how an image produced with a transducer probe that moves in the same direction as the acoustic scan direction is effectively distorted on the display monitor.

In contrast to the image displayed in FIG. 2A, the image of points 34 and 36 created by the system 20 is distorted when the transducer probe is in motion. FIG. 2B illustrates a frame 32b displaying an image of the points 34b and 36b produced when the transducer probe is moving in the same direction of the acoustic scan as indicated by a ray 40. FIG. 3 illustrates how the distance between points 34b and 36b, as shown in FIG. 2B, becomes distorted. Referring to FIG. 3, during a real-time scan, the actual width of tissue scanned while the transducer probe is moving in the same direction as the acoustic scan, represented by a ray 52, is greater than the width scanned while the probe is stationary, represented by a ray 50. However, the size of the frame 32 displayed on the monitor 26 itself remains the same. Thus, the data recorded by the transducer in the case as shown in FIGS. 2B and 3 is essentially scaled down to be completely displayed in the frame 32b. The result is an image that appears to be compressed as compared to the image produced while the transducer probe is stationary, (i.e., the distance between points 34b and 36b (FIG. 2B) is less than the actual distance between the points and the distance as shown in FIG. 2A).

In contrast to the compression shown in FIG. 2B, FIG. 2C illustrates a frame 32c displaying an image of the points 34c and 36c produced when the direction of the transducer probe motion is in the opposite direction of the acoustic scan direction, represented by a ray 60. In this instance, the actual width of tissue scanned by the transducer is less than the width scanned while the probe is stationary. Thus, when displayed on frame 32c, the distance between the points 34c and 36c is greater than the actual distance between the points and the distance as shown in FIG. 2A. As a result, each frame acquired while the transducer probe is moving will be either enlarged or compressed laterally, depending on which direction the transducer probe is moving.

This invention is directed to a system and method for "un-warping" each ultrasound display frame, i.e., to enlarge or compress it appropriately, in order to improve the geometric accuracy of the image. As more fully described below, this is accomplished first by calculating the actual horizontal width of the tissue represented within each frame or pixel. The resulting data can then be used in numerous ways to correct the geometric accuracy of the image. For example, the data can be used to alter the ultrasound image itself or to create a ruler displayed on the frame which is used to estimate the true distance between points. Furthermore, the data could be used to calculate the length of a segment in the image in response to a request by a physician or sonographer and then output the resulting measurement. As will also be better understood from the following description, the data can be used as indicated generally above to correct the geometry of a real-time ultrasound frame, a single cine frame used to produce a SIESCAPE™ compound image, or the compound image produced using SIESCAPE™.

Figure 4:
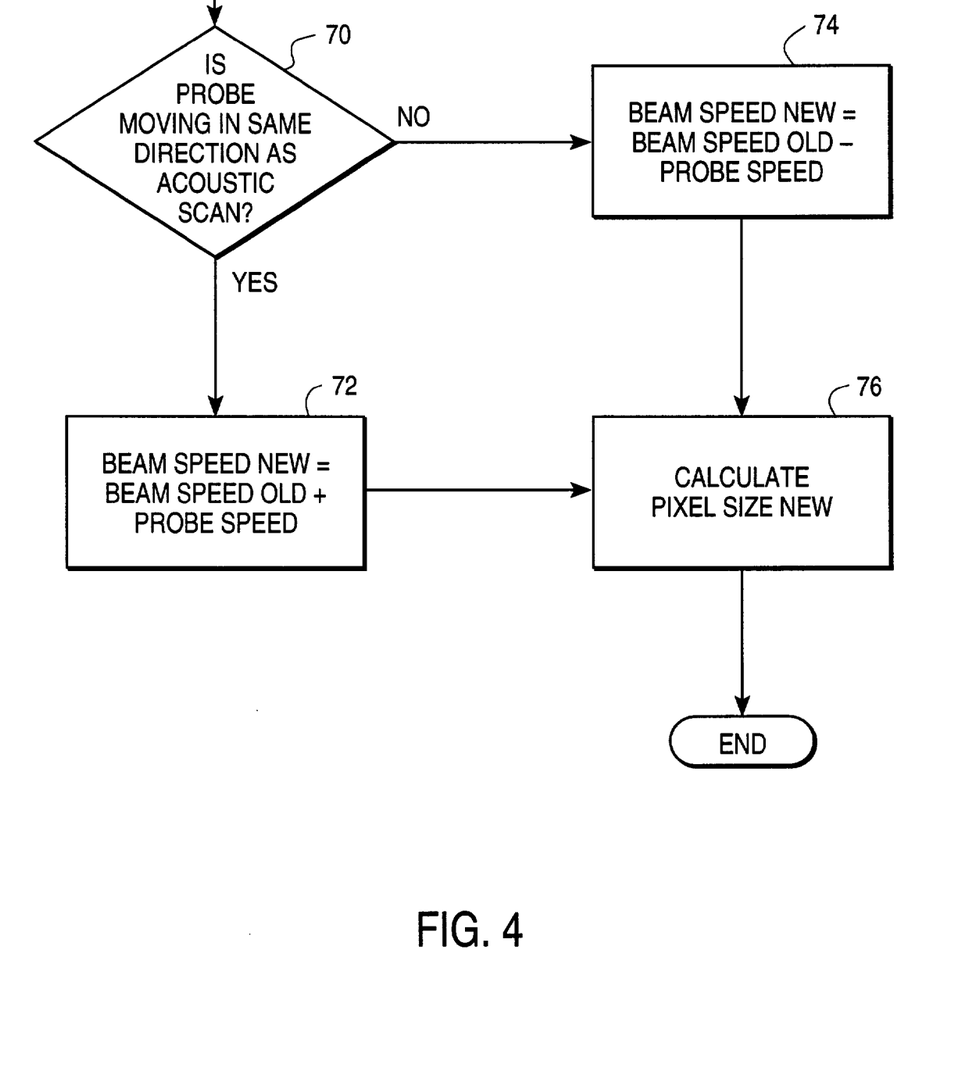
FIG. 4 is a flow diagram that illustrates the calculation of the amount of tissue represented in each pixel when the transducer is moving according to this invention.

FIG. 4 is a flow diagram that illustrates the steps performed by the present invention to un-warp the ultrasound frame in order to improve the geometric accuracy of the image displayed. As discussed above, the distortion in an ultrasound frame is caused in part by the motion of the transducer probe. The resulting image is either compressed or enlarged horizontally while the frame and the number of pixels within the frame remain the same. Thus, the horizontal dimension of tissue represented within each pixel (or frame) is changed when transducer probe motion exists. To solve for this bias problem, the actual horizontal dimension of tissue represented within each pixel produced while the probe is in motion must be calculated.

Before making this calculation, it will be appreciated by those skilled in the art and others that while the above-described distortion is present in a typical ultrasound frame (i.e., standard B-mode) if the transducer probe is moving, the error is always present in images created with a SIESCAPE™ feature produced by Siemens Medical Imaging since this feature requires that the probe move laterally. The SIESCAPE™ technique is disclosed in U.S. Pat. No. 5,575,286 entitled Method and Apparatus for Generating Large Compound Ultrasound Image, and U.S. Pat. No. 5,782,766 entitled Method and Apparatus for Generating and Displaying Panoramic Ultrasound Images, and both are hereby incorporated by reference. In general, the SIESCAPE™ technique produces a composite image by comparing frames and appropriately combining the frames together to form a compound image. In practice, after the compound image is formed and displayed on the monitor 26, an individual cine frame, used to create the compound image, can be recalled and displayed. Thus, as more fully described below, this invention can be used to correct images displayed in a standard B-mode frame, a single cine frame used to produce a SIESCAPE™ compound image, or the SIESCAPE™ composite image.

Returning to FIG. 4, beginning at a step 70, the ultrasonic imaging system 20 determines whether the transducer probe is moving in the same direction as the acoustic scan direction. If the transducer probe is moving in the same direction as the acoustic scan direction, then the acoustic beam scanning speed relative to the tissue while the probe is in motion is set equal to the acoustic beam scanning speed while the probe is stationary plus the probe motion speed at a step 72. On the other hand, if the transducer probe motion is in the opposite direction as the acoustic scan direction, the acoustic beam scanning speed relative to the tissue while the probe is in motion is set equal to the acoustic beam scanning speed while the probe is stationary minus the probe motion speed at a step 74.

The acoustic beam scanning speed while the probe is stationary is known by multiplying the frame rate of the ultrasonic imaging system 20, defined by the number of image frames produced per second, with the horizontal width of the image as represented within the frame while the probe is stationary. Both of these values are known by the ultrasonic imaging system 20, and thus the acoustic beam scanning speed while the probe is stationary is easily determined.

On the other hand, the probe speed is more difficult to calculate. One way of determining the probe speed is to measure it by an external reference. However, this would require encumbering the handheld transducer with position sensing devices that would otherwise increase the cost, weight and complexity of the ultrasonic imaging system. Preferably, the probe speed is estimated similarly as disclosed in U.S. Pat. Nos. 5,575,286 and 5,782,766 (hereinafter the SIESCAPE™ patents). In general, the SIESCAPE™ patents indicate that the probe speed is estimated from a local motion vector which indicates the direction and magnitude of how a portion of an image is translated from one frame to the next. The local motion vector represents the length, in number of pixels, that a portion of the image translates horizontally from one frame to the next, without bias correction. Briefly stated, the motion vector can be determined by comparing the location of a group of pixels in sequential images. The patterns are generally recognized by a minimum sum absolute difference calculation. This estimated local motion vector is divided by the time between frames, which is known by the ultrasonic imaging system, to estimate probe speed in pixels/second. In order to determine the probe speed relative to the tissue, this value needs to be multiplied by the width of tissue represented in each pixel, resulting in units of millimeters/second for example. It will be appreciated that the width of tissue represented in each pixel while the probe is stationary can be used for the above calculation to estimate probe speed. Preferably, as better exemplified below, the width of tissue represented in each pixel while the probe is in motion is used to estimate the probe speed. Thus, the probe motion speed equals the SIESCAPE™ estimated horizontal motion vector length without bias correction (in number of pixels) times the horizontal width of the tissue represented in each pixel produced while the probe is in motion divided by the time between the two frames that are used in SIESCAPE™ to estimate the motion vectors. It will be appreciated by those skilled in the art and others that the horizontal width of the tissue represented in each pixel produced while the probe is in motion is not a known value. However, as more fully described below, this formula for probe speed can be used in the derivation of the horizontal width of the tissue represented in each pixel produced while the probe is in motion.

Accordingly, at a step 76, the acoustic beam scanning speed, relative to the image while the probe is in motion, calculated from either step 72 or step 74 is used to derive and further calculate the horizontal width of the tissue represented in each pixel of the frame produced while the probe is moving. In general, since the time to complete one frame of an image is the same regardless of whether the probe moves or not, the horizontal width of the tissue represented in each pixel while the probe is moving is equal to the horizontal width of the tissue represented in each pixel while the probe is stationary multiplied by the ratio of the acoustic beam scanning speed relative to the tissue while the probe is in motion to the acoustic beam scanning speed while the probe is stationary.

In one embodiment, the variables and equations set forth below are used in the derivation and calculation of the horizontal width of the tissue represented in each pixel produced in a frame while the probe is moving, denoted pixelSizeNew. First, the variables needed to calculate pixelSizeNew are defined as follows:

lengthOld=old image width represented within a frame in mm, without probe motion;

lengthNew=new image width represented within a frame in mm, with probe motion;

directionAcousticScan=the direction in which the acoustic beam moves across the image;

numberPixels=the number of pixels in the width of a frame;

directionProbeMotion=the probe motion direction;

probeSpeed=probe motion speed in mm/sec;

beamTime=the time between acoustic beams, in sec;

numberBeams=total number of acoustic beams within the image width;

frameRate=number of frames per second;

pixelSizeOld=the old horizontal width of tissue represented in each pixel, without probe motion, in mm;

pixelSizeNew=the new horizontal width of tissue represented in each pixel, with probe motion, in mm;

beamSpeedOld=the acoustic beam scanning speed across the image without probe motion, in mm;

beamSpeedNew=the effective acoustic beam scanning speed across the image with probe motion, in mm/sec;

vectorLengthOld=SIESCAPE™ estimated horizontal motion vector length without bias correction, in number of pixels;

vectorLengthNew=SIESCAPE™ estimated horizontal motion vector length after bias correction, in number of pixels;

timeBetweenFrames=the time between two frames which are used in SIESCAPE™ to estimate the motion vectors, in sec.

Using the above defined variables, pixelSizeNew is derived as shown in Equations 1–14 and ultimately calculated as shown in Equations 13 and 14. First, the following general relationships are defined:

$$\text{frameRate}=1/(\text{beamTime}*\text{numberBeams}), \text{ in } 1/\text{sec}. \quad (1)$$

$$\text{pixelSizeOld}=\text{lengthOld}/\text{numberPixels}. \quad (2)$$

$$\text{pixelSizeNew}=\text{lengthNew}/\text{numberPixels}. \quad (3)$$

$$\text{beamSpeedOld}=\text{lengthOld}*\text{frameRate}. \quad (4)$$

If directionProbeMotion is the same as directionAcousticScan, then $$\text{beamSpeedNew}=\text{beamSpeedOld}+\text{probeSpeed}, \quad (5)$$

else $$\text{beamSpeedNew}=\text{beamSpeedOld}-\text{probeSpeed}. \quad (6)$$

Because the time to complete one frame of image is the same regardless of whether the probe moves or not, the following equation is set forth:

$$\text{lengthNew}/\text{beamSpeedNew}=\text{lengthOld}/\text{beamSpeedOld} \quad (7)$$

Assuming directionProbeMotion is the same as directionAcousticScan, from Equations (4), (5) and (7), the following equation is obtained:

$$\text{lengthNew}/(\text{lengthOld}*\text{frameRate}+\text{probeSpeed})=1/\text{frameRate} \quad (8)$$

By rearranging Equation (8), the following equation is obtained:

$$\text{lengthNew} = \text{lengthOld} + \text{probeSpeed}/\text{frameRate} \qquad (9)$$

From SIESCAPE™ probe motion estimation and as described above, it is also known that $$\text{probeSpeed} = (\text{vectorLengthOld} * \text{pixelSizeNew})/\text{timeBetweenFrames}. \qquad (10)$$

Preferably, in Equation (10), the actual pixel size, pixelSizeNew, is used to compute the probe motion distance in mm. Therefore, there is less approximation in Equation 10 than if pixelSizeOld is used.

By combining Equation (9) with Equation (10) and Equation (3), the following equation is obtained:

$$\text{lengthNew} = \text{lengthOld} + (\text{vectorLengthOld} * \text{lengthNew})/(\text{numberPixels} * \text{frameRate} * \text{timeBetweenFrames}). \qquad (11)$$

By rearranging Equation (11), the resulting equation is:

$$\text{lengthNew} = \text{lengthOld} * [\text{frameRate} * \text{timeBetweenFrames}/(\text{frameRate} * \text{timeBetweenFrames} - \text{vectorLengthOld}/\text{numberPixels})]. \qquad (12)$$

Dividing both sides of Equation (12) by numberPixels, the expected result is finally calculated:

$$\text{pixelSizeNew} = \text{pixelSizeOld} * [\text{frameRate} * \text{timeBetweenFrames}/(\text{frameRate} * \text{timeBetweenFrames} - \text{vectorLengthOld}/\text{numberPixels})], \text{ in mm.} \qquad (13)$$

Alternatively, if directionProbeMotion is opposite to directionAcousticScan, the result is:

$$\text{pixelSizeNew} = \text{pixelSizeOld} * [\text{frameRate} * \text{timeBetweenFrames}/(\text{frameRate} * \text{timeBetweenFrames} + \text{vectorLengthOld}/\text{numberPixels})], \text{ in mm.} \qquad (14)$$

After calculating pixelSizeNew, the resulting data can be used in a variety of ways to effectively correct the geometry of an image created by a moving transducer. As more fully described below, three such ways include: modifying the image itself; creating a ruler having "tick" marks displayed on the frame for use by a physician or sonographer to indicate the actual geometry of the image; or using the values in a measurement algorithm within the ultrasound scanner to output true measurements of length of a segment selected by the physician or sonographer. These various methods can be used to correct a standard B-mode frame, a single cine frame used to produce a SIESCAPE™ compound image, or the SIESCAPE™ composite image itself. Measurements of length taken from any of these frames where the above-described distortion has been corrected are superior to measurements taken when the distortion has not been corrected. However, better results are obtained from the bias corrected single B-frame or single cine frame, rather than the bias corrected SIESCAPE™ composite image, since there is some estimation involved in creating the composite image.

In a first embodiment, the resulting data, pixelSizeNew, is used to modify the image displayed in a standard B-mode frame or a single SIESCAPE™ cine frame such that the frame displays the correct geometry of the actual image scanned. Alternatively, in order to correct a SIESCAPE™ composite image, after obtaining the local motion vectors, vectorLengthOld, from the SIESCAPE™ algorithm as disclosed in the SIESCAPE™ patent, the local motion vectors are modified based upon the difference between the old and new pixel horizontal scales in Equations 13 and 14. The correction is made as follows:

If directionProbeMotion is the same as directionAcousticScan, the result is:

$$\text{vectorLengthNew} = \text{vectorLengthOld} * [\text{frameRate} * \text{timeBetweenFrames}/(\text{frameRate} * \text{timeBetweenFrames} - \text{vectorLengthOld}/\text{numberPixels})], \text{ in pixels.} \qquad (15)$$

If directionProbeMotion is opposite to directionAcousticScan, the result is:

$$\text{vectorLengthNew} = \text{vectorLengthOld} * [\text{frameRate} * \text{timeBetweenFrames}/(\text{frameRate} * \text{timeBetweenFrames} + \text{vectorLengthOld}/\text{numberPixels})], \text{ in pixels.} \qquad (16)$$

This correction is performed on all of the local motion vectors before being combined to estimate the frame global motion vector as described in the SIESCAPE™ patents. The result is a SIESCAPE™ composite image that is corrected for the above described bias created while the probe is in motion. This is the preferred method for correcting a SIESCAPE™ composite image.

In an alternative embodiment, the ultrasound scanner 24 uses pixelSizeNew to create a ruler at the top of a frame for accurately measuring the image. The ruler has "tick" marks, and the space between each tick mark represents a uniform distance. Thus, it will be appreciated that the tick marks could appear unevenly spaced if the distortion within the image varies. However, if the probe speed was uniform, then the distortion in the image as displayed on the frame is also uniform, and thus the tick marks would appear evenly spaced.

Finally, in a further embodiment, the ultrasound scanner 24 uses the pixelSizeNew data to produce more accurate measurements from the images displayed on the monitor 26. In practice, after the physician or sonographer selects a segment of the image from the frame, the ultrasound scanner 24 uses the pixelSizeNew data to output the actual measurement of the segment's length. This is the preferred method for correcting a standard B-mode frame or a single SIESCAPE™ cine frame.

Figure 5:
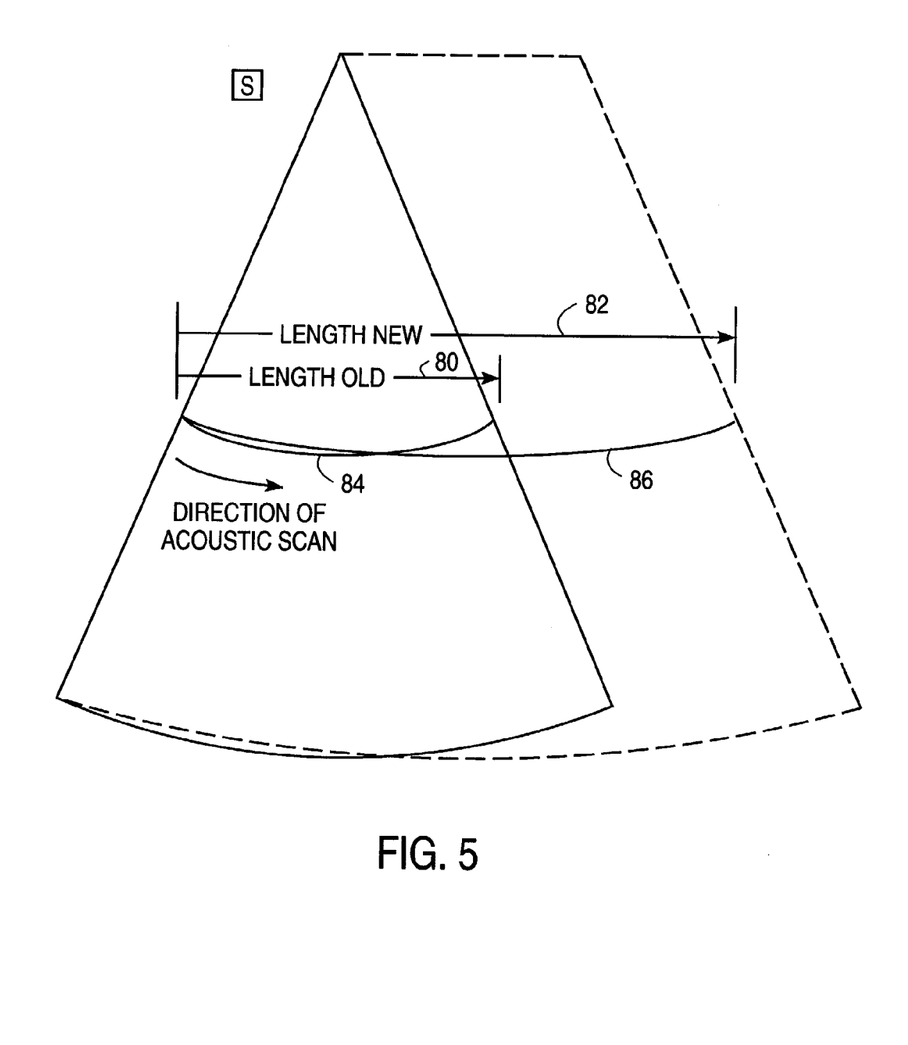
FIG. 5 illustrates how an image produced in sector scan format with a transducer probe that moves in the same direction as the acoustic scan direction is effectively distorted.

It will be further appreciated that this invention can be applied to transducers that produce images in linear scan format, as described above, as well as transducers that produce images in other formats such as a sector scan format. FIG. 5 illustrates how the image created in a sector scan format is effectively distorted. The main difference between linear and sector scan formats is that in sector scan format, directionAcousticScan is an arc rather than a straight line as shown in FIG. 2. A precise analysis should break the arc motion into its horizontal and vertical components, and apply the above equations (1) through (14) to the horizontal component. However, in most ultrasound scans, the sector angle is limited. Therefore, to simplify the analysis, the length of a straight line 80 or 82 can be used to approximate an arc length 84 or 86, respectively, if the acoustic scan speed is assumed to be relatively constant along the lines 80 or 82. With these assumptions, the derivations in equations (1) through (14) remain valid at each individual vertical depth since the number of pixels across a sector varies depending on the vertical depth.

Preferably, if the image is in sector scan format, the additional variables and equations set forth below are used to calculate the estimated horizontal motion vector length after bias correction, vectorLengthNew. First, Equations 15 and 16 are modified to provide the following equation for vectorLengthNew:

$$\text{vectorLengthNew} = \frac{\text{vectorLengthOld}}{\left[1 + \left(\frac{\text{scanDir} \times \text{vectorLengthOld}}{\text{pixelRate} \times \text{timeBetweenFrames}}\right)\right]} \quad (17)$$

where scanDir is "+1" if the probe motion direction and acoustic beam scan direction are the same and "−1" if the probe motion direction is in the opposite direction to the acoustic beam scan direction and where pixelRate is the pixel rate in number of pixel per second at a particular horizontal row in the image frame.

Figure 6:
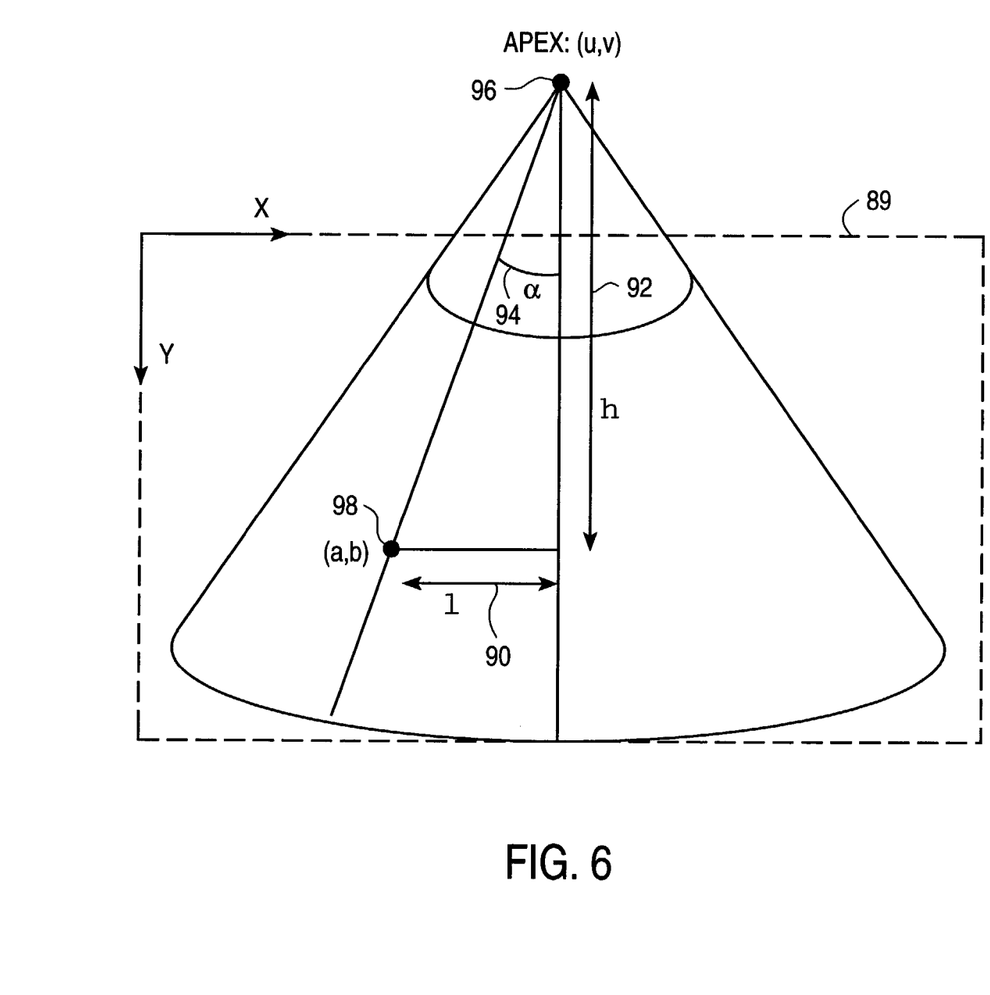
FIG. 6 illustrates a diagram of an image frame in sector scan format illustrating the geometry for calculating the pixel rate.

FIG. 6 illustrates a diagram of an image frame 89 in sector scan format illustrating the geometry for calculating the pixel rate. The image frame 89 includes a length 90, denoted "l"; a height 92, denoted "h"; an angle 94, denoted "α"; an apex point 96, denoted by the screen pixel coordinates "(u,v)", and a point 98, denoted by the screen pixel coordinates "(a,b)". The pixel rate in the case of an image in sector scan format is equivalent to the change in time of length 90, as represented in the following equation:

$$\text{pixelRate} = R_S = \frac{dl}{dt} \quad (18)$$

From the geometry of the image frame 89, it is known that the length 90 can be represented as follows:

$$l = h \times \tan a \quad (19)$$

By taking the derivative of Equation 19, the following equation for the pixel rate is obtained:

$$R_S = h \times \sec^2 a \times \frac{da}{dt} \quad (20)$$

Then, from the geometry of the image frame 89, as shown in FIG. 6, Equation 20 can be modified as follows:

$$R_S = \frac{h^2 + l^2}{h} \times \frac{da}{dt} \quad (21)$$

Preferably, the length 90 and height 92 are determined using the coordinates (a,b) and (u,v) such that the length 90 equals the absolute value of the quantity (a−u) and the height 92 equals the absolute value of the quantity (b−v). After calculating the pixel rate, this value is used in Equation 17 to determine the estimated horizontal motion vector length after bias correction, vectorLengthNew, for an image produced in sector scan format. In turn, vectorLengthNew can be used as identified above to effectively correct for the distortion caused by the moving transducer in the image frame 89.

As demonstrated above, this invention is a system and method for correcting the geometry of ultrasonic images acquired with a moving transducer. This invention makes the geometry of B-mode frames and SIESCAPE™ cine frames acquired with a moving transducer substantially as accurate as B-mode frames acquired with a stationary transducer. As a result, this invention saves exam time by eliminating the need for a user to re-acquire a B-mode frame with a stationary transducer in order to make an accurate diagnosis and measurements. Additionally, the geometry of SIESCAPE™ composite images can also be improved.

The embodiments of the invention in which an exclusive property or privilege is claimed are defined as follows:

1. A method for correcting the geometry of an ultrasound image acquired with a moving transducer that acoustically scans a target for display in a frame on a monitor, the transducer having a probe motion direction, a probe speed, an acoustic beam scan direction and an acoustic beam scanning speed the method comprising:

multiplying a width of the target scanned while the transducer is stationary by a ratio of an acoustic beam scanning speed relative to the target while the transducer is moving to an acoustic beam scanning speed while the transducer is stationary to determine a width of the target scanned while the transducer is moving; and indicating the correct geometry of the image acquired while the transducer is moving by using the width of the target scanned while the transducer is moving.

2. The method of claim 1, wherein the acoustic beam scanning speed relative to the target while the transducer is moving is equal to the acoustic beam scanning speed while the transducer is stationary plus the probe speed if the probe motion is in the same direction as the acoustic scan direction.

3. The method of claim 2, wherein the acoustic beam scanning speed relative to the target while the transducer is moving is equal to the acoustic beam scanning speed while the transducer is stationary minus the probe speed if the probe motion is in the opposite direction as the acoustic scan direction.

4. The method of claim 3, wherein the step of indicating the correct geometry of the image comprises generating a corrected image for display in the frame.

5. The method of claim 4, wherein the corrected image is a standard B-mode image.

6. The method of claim 4, wherein the corrected image is a single cine frame used to produce a compound ultrasound image.

7. The method of claim 4, wherein the corrected image is a compound image.

8. The method of claim 3, wherein the step of indicating the correct geometry of the image comprises displaying a ruler on the monitor, the ruler having a number of length identifying marks that are scaled based on the width of the target scanned while the transducer is moving.

9. The method of claim 8, wherein the length identifying marks represent a uniform distance between each adjacent mark.

10. The method of claim 9, wherein the length identifying marks are equidistantly spaced if the probe speed is constant.

11. The method of claim 3, wherein the step of indicating the correct geometry of the image comprises generating a measurement of a segment selected from the image based upon the width of the target scanned while the transducer is moving.

12. The method of claim 3, wherein the transducer acquires images in linear scan format.

13. The method of claim 3, wherein the transducer acquires images in sector scan format.

14. An ultrasonic imaging system for providing an ultrasonic image, comprising:

a transducer for receiving an ultrasonic echo reflected from a patient's body tissue and generating electronic echo signals from the ultrasonic echo, the transducer having a probe motion direction and speed and an acoustic beam scanning direction and speed;

an ultrasound scanner coupled to the transducer, the ultrasound scanner for receiving the electronic echo signals from the transducer and producing an ultrasonic image frame, the scanner including a processor that is programmed to derive the width of the tissue represented in the image frame that is acquired while the probe is in motion based on a ratio of the acoustic beam scanning speed relative to the tissue while the probe is in motion to the acoustic beam scanning speed while the transducer is stationary and to correct for distortion caused by the probe movement based upon the derived width; and a monitor coupled to the ultrasound scanner, the monitor for displaying the actual dimensions of the tissue in an ultrasonic image frame acquired while the transducer is moving.

15. The ultrasonic imaging system of claim 14, wherein the processor determines the new acoustic beam scanning speed relative to the tissue while the probe is in motion by:

summing the acoustic beam scan speed relative to the tissue while the probe is stationary and the probe speed, if the probe motion is in the same direction as the acoustic scan direction; or subtracting the probe speed from the acoustic beam scan speed relative to the tissue while the transducer is stationary, if the probe motion is in the opposite direction to the acoustic scan direction.

16. The ultrasonic imaging system of claim 15, wherein the probe speed is estimated from an external source.

17. The ultrasonic imaging system of claim 15, wherein the probe speed is estimated by dividing an estimated horizontal motion vector representing the translation of one frame to the next by the elapsed time between frames.

18. The ultrasonic imaging system of claim 15, wherein the processor corrects for the distortion by scaling the image to display the actual dimensions of the tissue.

19. The ultrasonic imaging system of claim 15, wherein the processor corrects for the distortion by generating a ruler on the monitor, the ruler having a number of length identifying marks that are scaled based on the actual dimensions of the tissue.

20. The ultrasonic imaging system of claim 19, wherein the length identifying marks represent a uniform unit of length between each adjacent tick mark.

21. The ultrasonic imaging system of claim 20, wherein the length identifying marks are equidistantly-spaced if the probe speed is constant.

22. The ultrasonic imaging system of claim 15, wherein the processor corrects for the distortion by generating a measurement of a segment of the tissue selected from the image in the monitor.

23. The ultrasonic imaging system of claim 15, wherein the transducer scans in linear format.

24. The ultrasonic imaging system of claim 15, wherein the transducer scans in sector format.

* * * * *